United States Patent [19]

Henshaw

[11] 4,244,899

[45] Jan. 13, 1981

[54] METHOD FOR CHEMICAL EMBOSSING A FOAMABLE THERMOPLASTIC RESIN SHEET USING AN INK COMPOSITION CONTAINING A CHEMICAL BLOWING AGENT

[75] Inventor: David I. M. Henshaw, Barrington, England

[73] Assignee: Congoleum Corporation, Portsmouth, N.H.

[21] Appl. No.: 14,157

[22] Filed: Feb. 22, 1979

Related U.S. Application Data

[63] Continuation-in-part of Ser. No. 725,125, Sep. 20, 1976, abandoned.

[30] Foreign Application Priority Data

Oct. 7, 1975 [GB] United Kingdom ............... 40916/75

[51] Int. Cl.³ .............................................. B29D 27/00
[52] U.S. Cl. ..................................... 264/45.1; 264/54; 264/DIG. 82
[58] Field of Search ........ 264/52, DIG. 82, DIG. 18, 264/45.1, 54

[56] References Cited

U.S. PATENT DOCUMENTS

| | | | |
|---|---|---|---|
| 3,293,094 | 12/1966 | Nairn et al. ......................... | 264/52 X |
| 3,373,072 | 3/1968 | Jones .................................. | 264/52 X |
| 3,399,106 | 8/1978 | Palmer et al. ....................... | 161/119 |
| 3,464,934 | 9/1969 | Birkett et al. ....................... | 264/52 X |
| 3,819,783 | 6/1974 | Jones .................................. | 264/52 |
| 3,821,059 | 6/1974 | Hensel ................................ | 264/52 X |

FOREIGN PATENT DOCUMENTS 1481712  4/1967  France .

*Primary Examiner*—Philip Anderson
*Attorney, Agent, or Firm*—Wenderoth, Lind & Ponack

[57] ABSTRACT

A process for embossing a thermoplastic polymeric material by selective expansion which comprises forming into sheet form an expandable mix containing a thermoplastic polymeric material and a chemical blowing agent, applying to selected areas of the surface of the sheet an activator ink composition in the form of a plastisol or organosol containing a vinyl resin, a plasticizer for the vinyl resin, and a kicker for the chemical blowing agent in the expandable mix, and heating the sheet to a temperature and for a time such that in those areas of the sheet in contact with the kicker-containing activator ink composition, the chemical blowing agent is decomposed to a greater degree than in the remaining areas and the sheet is thereby differentially selectively expanded.

15 Claims, No Drawings

METHOD FOR CHEMICAL EMBOSSING A FOAMABLE THERMOPLASTIC RESIN SHEET USING AN INK COMPOSITION CONTAINING A CHEMICAL BLOWING AGENT

This application is a continuation-in-part of Ser. No. 725,125, filed Sept. 20, 1976, now abandoned.

The present invention relates to a process for the manufacture of expanded thermoplastic materials.

It is known to form so-called 'chemically embossed' materials by the selective expansion of a thermoplastic polymeric material. In one such chemical embossing process, described in U.S. Pat. Nos. 3,464,934 and 3,819,783 an expanded mix containing a thermoplastic polymeric material and a chemical blowing agent is formed into sheet form, a printing ink containing a kicker for the blowing agent is applied to selected areas of the surface of the sheet. On heating the sheet, the printed areas expand more than the unprinted areas to give a sheet having an embossed appearance. Such processes are called herein activation processes.

An alternative process, described for example in U.S. Pat. Nos. 3,293,094 and 3,373,072, the printing ink contains an inhibitor for the blowing agent. On heating, the unprinted areas expand to a greater extent than the printed areas to give the embossed appearance. Such processes are called herein inhibition processes.

The printing of the sheets in these processes is conventionally by rotary gravure processes, known and used for many years for printing vinyl and other polymeric materials. Rotary gravure processes require inks which flow easily, and the inks used are generally solutions or liquid dispersions. Thus, conventional inks conventionally comprise a solution of a film-former or binder resin, such as a copolymer of vinyl chloride and vinyl acetate, in a solvent, usually a ketone. The ink also contains a dye or pigment which is dispersed or dissolved in the ink as appropriate.

The film-former or binder resin is present only in dilute solution and is required to facilitate the adhesion of the ink to the printed sheet. Without such a film-former or binder resin, pigments are likely to 'brush off' the printed sheet.

The inks in the prior art processes have conventionally been applied as layers upto 0.001 inch (usually about 0.0001 inch) in thickness. It will be appreciated that such layers are only decorative and have little or no wear resistance. In addition, the final material tends to have an uneven surface. In general, therefore, a wear layer is required for most applications.

Materials having an embossed appearance are also produced by a rotary screen process wherein an expandable plastisol is rotary screen printed onto a thermoplastic polymeric material, and the printed product heated to cause expansion of the plastisol. However, the expansion of the printed plastisol in this process may lead to an uneven surface, lower tonal value of the finished product, and a surface having poor physical properties which will generally require a wear layer for protection.

I have found that the activator ink may be used in the form of a plastisol or organsol with considerable advantage and permit the use of rotary screens in that process. However, my invention requires a lower deposit of plastisol than the known rotary screen processes, and thus finer mesh screens may be used, leading to better print clarity and design definition.

The present invention does not generally lead to an expanded plastisol (although this may be produced if required), and thus permits a product to be obtained having a smooth printed area of full tonal value and sufficiently good physical properties to obviate the need for a wear layer in many applications, such as heavy-duty wall-coverings and the like. Thus, unlike earlier activation processes, the printed areas are both decorative and functional. This is a particularly important advantage since wear layers, required in the prior art processes, dull the colours of the printed material and reduce the definition of the design. The present invention permits the production of an embossed material having brighter colours, a full range of tonal values and improved pattern definition.

Since the present invention involves the use of relatively thick ink layers, for example 0.001–0.015 inch, it will be appreciated that the advantages of the invention will not generally be obtained in an inhibition process, where the unprinted areas expand. In that case, the thicker ink layers will tend to fill the valley regions of the expanded material, thereby reducing the contrast of the product.

Accordingly, in one embodiment, the present invention provides a process for embossing a thermoplastic polymeric material by selective expansion which comprises forming into sheet form an expandable mix containing a thermoplastic polymeric and a chemical blowing agent, applying to selected areas of the surface of the sheet an activator ink containing a kicker for the blowing agent, and heating the sheet to a temperature and for a time such that in those areas of the sheet in contact with the kicker composition, the blowing agent is decomposed to a greater degree than in the remaining areas and the sheet is thereby differentially expanded, characterised in that the activator ink is in the form of a plastisol or organsol containing a vinyl resin, and 10–200 parts by weight plasticiser per 100 parts by weight vinyl resin.

The term 'plastisol' as used herein designates a paste prepared from a dispersion vinyl resin and a plasticiser. The term 'organosol' as used herein designates a composition containing a dispersion vinyl resin, a plasticizer, a volatile vinyl resin solvent, and a diluent.

The process described is of special application in the manufacture of flooring, wall and ceiling covering materials. For flooring materials, heavy grade materials are obviously required, and the flooring material is usually made of a textile base laminated to the main supporting plastic sheet which may be expanded or non-expanded and to which is laminated the surface sheet, which is differentially expanded to produce the decorative wear surface. For the wall and ceiling covering materials, which may be considered as wallpapers, these may comprise a paper or fabric base on to which is spread or laminated the surface sheet, which is differentially expanded to produce the desired decorative surface.

The differentially expanded sheet is prepared by the interaction of the sheet formed from the expandable mix, and the composition containing the kicker herein referred to for convenience as the 'activator ink'.

The vinyl resin in the activator ink is suitably polyvinyl chloride or a copolymer of vinyl chloride (for example copolymers with vinyl acetate or ethylvinyl acetate).

Plasticisers for use in the activator ink include esters of phthalic acid (for example, butyl benzyl phthalate, dioctyl phthalate, dialphanyl phthalate and diisooctyl phthalate), esters of sebacic acid (for example, dioctyl sebacate), esters of adipic acid (for example, dioctyl adipate), and phosphoric acid esters (for example, tricresyl phosphate and octyl diphenyl phosphate).

The proportions of vinyl polymer and plasticiser will depend on the viscosity which is desired. The activator ink should contain 10–200 parts, and preferably 15–70 parts, by weight plasticiser per 100 parts by weight of vinyl resin.

Suitable volatile vinyl resin solvents for the organosol include ketones, particularly di-lower alkyl ketones, (for example, acetone, methyl ethyl ketone and methyl iso-butyl ketone), and cyclohexanone.

The kicker used in the activator ink may comprise any of a number of compounds which lower the decomposition temperature of the blowing agent including compounds of zinc (such as zinc oxide, zinc octoate, zinc nitrate and zinc fatty acid soaps), compounds of cadmium (such as cadmium octoate, cadmium caproate, cadmium laurate, cadmium myristate and cadmium fatty acid soaps) and compounds of lead (such as lead carbonate, lead phthalate, lead phosphite and lead stearate). Preferably, however, the kicker comprises a zinc compound such as zinc octoate or zinc nitrate.

In one embodiment, the activator ink contains a chemical blowing agent to cause expansion of the activator ink during processing. Expansion then gives a product wherein the ink itself is expanded, and the product has a correspondingly greater depth of emboss. The concentration of blowing agent in the ink is suitably 0.2–5 parts, preferably 0.5 to 4 parts, by weight per hundred parts by weight of resin. The blowing agent is preferably the same as that in the expandable mix, and is most preferably azodicarbonamide.

The activator ink desirably contains 0.5% to 25% by weight of the kicker and preferably contains 1% to 20% by weight of the kicker. In the case of organosols, the activator ink also contains a volatile diluent, for example, xylene, white spirits or dodecyl benzene.

The activator ink may also include other additives such as pigments, dyes, fillers, solvents, diluents, viscosity depressants, and stabilisers. However, stabilisers should not have an activating effect which would swamp the desired effect of the kicker. In many instances, however, the kicker in the ink will also serve as a stabiliser.

The thickness of the ink layer will depend on various factors and end uses, but in general is preferred to be 0.001–0.015 inch (more preferably 0.001–0.008 inch). If necessary, to obtain the thick layers, the printing operation can be carried out twice, and the composition of the second printing ink may be different from that of the first.

The thermoplastic polymeric material may comprise a condensation polymer such as a polyamide (for example polycaprolactam or polyaminoundecanoic acid), or a polyester (for example terephthalate polyesters). Alternatively, the thermoplastic polymeric material may comprise an addition polymer such as a polyolefin (for example polyethylene or polypropylene), a polyacrylate (for example polymethylmethacrylate), a polystyrene or a polymerisation product of a halogen substituted olefin such as polyvinyl chloride.

Preferred thermoplastic polymeric materials are polymers or copolymers derived from vinyl chloride, for example polyvinyl chloride, a copolymer of vinyl chloride with the vinyl esters of fatty acids (such as vinyl acetate) or with other polymerisable vinyl-containing monomers (such as vinylidene chloride, acrylic acid and styrene).

The blowing agent may be any of the conventional blowing agents, the decomposition temperature of which is lowered in the presence of a variety of compounds known as kickers. It is, however, essential to select a blowing agent appropriate to the polymer being used; that is the blowing agent must decompose in the presence of a kicker at a temperature at which the polymer or a composition containing it is in a condition to be expanded. Examples of blowing agents include azodicarbonamide, barium azodicarboxylate, pp$^1$-oxybis (benzene sulphonyl hydrazide) and pp$^1$-oxybis (benzene sulphonyl semicarbazide). Preferably the blowing agent comprises azodicarbonamide.

The amount of blowing agent is preferably 1–10 parts by weight based on 100 parts by weight of the thermoplastic polymeric material.

The expandable mix is preferably made as a plastisol. Suitable plasticisers for making the plastisol include esters of phthalic acid (such as butyl benzyl phthalate, dioctyl phthalate, dialphanyl phthalate and diisooctyl phthalate), esters of adipic acid (such as di-octyl adipate), exters of sebacic acid (such as di-octyl sebacate), and phosphoric acid esters (such as tricresyl phosphate and octyl diphenyl phosphate). The amounts of plasticiser present in the expandable mix may vary over a wide range, for example 25 to 200 parts (preferably 30 to 70) by weight plasticiser per 100 parts by weight of thermoplastic polymeric material.

The expandable mix suitably also contains a filler, for example 1–50 parts by weight per 100 parts by weight of resin.

The expandable mix preferably contains a stabiliser for the polymeric material. Preferably, the stabiliser has little or no kicking action. Suitable stabilisers include tin compounds (for example dialkyl tin maleates, such as di-lower alkyl tin maleates, notably di-butyl tin maleate; dialkyl tin laurates, such as di-lower alkyl tin laurates; thio-tin compounds and tin mercaptides), barium compounds (for example, the octoates, caproates, laurates and myristates), and combinations of barium compounds with zinc or cadmium compounds, suitably fatty acid soaps. Preferably the expandable mix contains 0.1 to 5% stabiliser based on the weight of thermoplastic polymeric material.

The expandable mix may also contain other ingredients suitable for obtaining a desirable product. These additional ingredients include plasticisers, solvents, diluents, extenders, pigments, dyes, hardeners, viscosity depressants, fillers and other stabilisers.

The expandable mix may be formed into a sheet by extruding, casting, calendering or spreading the mix. Preferably the expandable mix is spread as a plastisol on to a suitable surface, which may or may not provide a permanent backing, and the plastisol is gelled; that is the plastisol is heated for a period of time sufficient for the plastisol layer to assume a solid tack-free state but insufficient to decompose the blowing agent. For optimum results the sheet of the expandable mix should be gelled to the minimum extent which will permit printing. Preferably the sheet is gelled at a temperature in the range 100° C. to 150° C. for a period of time in the range 2.5 minutes to 0.5 minutes. Desirably the higher the temperature of gellation the lower is the time of gellation.

The backing may be formed of a resinous material, a woven fabric, impregnated felted fibre or a release material such as paper coated for example with silicone, alginate or casein compositions.

The activator ink is preferably applied to the gelled plastisol expandable mix by any of the conventional printing techniques which is suitable. However, it is preferably applied by means of a screen printing technique. The printed ink may be gelled, for example at a temperature of 100-150° C., for 0.1 to 2.5 minutes. If desired, the printed (and optionally gelled) material is allowed to stand for a period of time for example up to 24 hours before expansion. The precise length of time will depend on the degree of differential expansion required, the differential increasing as the length of time increases.

For many applications, such as wall covering, a viable product may be obtained without a wear layer, so permitting a brightly coloured product as referred to above. However, if desired, a wear surface may be provided on the embossed surface. This may be achieved by applying to the printed and gelled plastisol a layer of a thermoplastic polymeric material which preferably does not contain a blowing agent.

The printed and gelled plastisol may be heated in a number of ways for example in hot air ovens or by infra red heaters. The temperature to which the printed and gelled plastisol is heated is above the decomposition temperature of the kicked blowing agent, and is preferably in the range 150° C.-210° C. The time for which the printed material is heated depends on the temperature and the degree of decomposition of the blowing agent required but is preferably in the range 15-300 seconds.

The following examples, in which all parts are by weight, is given to illustrate the invention.

EXAMPLE 1

| Expandable mix: | Parts |
| --- | --- |
| Polyvinyl chloride (Dispersion Grade K65) | 100 |
| Butyl benzyl phthalate | 21.2 |
| Dioctyl phthalate | 28.7 |
| Dodecyl benzene DOBANE JNX) | 5.8 |
| Azodicarbonamide (GENITRON AC4) | 3.1 |
| Dibutyl tin dilaurate | 0.5 |
| Epoxy plasticiser (LANKROFLEX ED3) | 3 |
| Titanium dioxide | 2.6 |
| White spirit | 3 |

The expandable mix was coated onto 0.004 inch paper, and pre-gelled for 60 seconds at 125° C. to a coating gauge of 0.012 inches.

| Plastisol activator ink | |
| --- | --- |
| Polyvinyl chloride (Dispersion grade K65) | 100 |
| Butyl benzyl phthalate | 35 |
| Viscosity depressant (DOBANE PT 12) | 9 |
| Zinc octoate (MANOMET ZINC 22) | 4 |

The activator ink was screen printed onto the expandable mix at a thickness of 0.0015 inches, and pre-gelled for 60 seconds at 125° C. The printed material was allowed to stand for 24 hours.

The printed material was expanded for 90 seconds at 200° C. The expanded product had an excellent embossed finish:

| Expanded gauge printed areas | 0.060 inches |
| --- | --- |
| Expanded gauge unprinted areas | 0.024 inches |

| -continued | |
| --- | --- |
| Contrast of finished product | 0.036 inches |

EXAMPLE 2

Example 1 was repeated, but after the gelling of the activator ink, and allowing to stand for 24 hours, the material was coated with 0.007 inch thick wear layer having the following formulation:

| Polyvinyl chloride (Dispersion grade K65) | 90 |
| --- | --- |
| Polyvinyl chloride (Granular grade K55) | 10 |
| Texonol isobutyrate (KODAFLEX TX1B) | 25 |
| Dioctyl phthalate | 5 |
| Butyl benzyl phthalate | 5 |
| Epoxy plasticiser (LANKROFLEX ED3) | 6 |
| Dibutyl tin dilaurate | 1 |
| Stabiliser (MARK C) | 0.5 |
| Viscosity depressant (NERCOSOL 2M12) | 2 |

The coated material was expanded for 90 seconds at 200° C. The expanded product has an excellent appearance:

| Expanded gauge printed areas | 0.060 inches |
| --- | --- |
| Expanded gauge unprinted area | 0.030 inches |
| Contrast of finished product | 0.030 inches |

EXAMPLE 3

| Expandable mix: | Parts |
| --- | --- |
| Polyvinyl chloride (Dispersion Grade K 72) | 100 |
| Dioctyl phthalate | 55 |
| Epoxy plasticiser (LANKROFLEX ED3) | 3 |
| Filler (CALIBRITE) | 35 |
| Azodicarbonamide (GENITRON AC4) | 4 |
| Pigment | 5 |
| Dibutyl tin dilaurate | 0.5 |
| Viscosity depressant (NERCOSOL 2M12) | 1 |

The expandable mix was coated to a thickness of 0.032 inches onto a 0.032 inch resin bonded asbestos substrate suitable for floor covering materials, and pre-gelled for 60 seconds at 125° C.

| Plastisol activator ink | Parts |
| --- | --- |
| Polyvinyl chloride (Dispersion Grade K73) | 100 |
| Butyl benzyl phthalate | 43 |
| Dioctyl phthalate | 11 |
| Epoxy plasticiser (LANKROFLEX ED3) | 3 |
| Liquid Ba/Cd stabiliser (MANOMET 65) | 2 |
| Zinc octoate | 4.6 |
| Pigment | 21 |
| Viscosity depressant (NERCOSOL 2M 12) | 1 |

A 0.002 inch deposit of the activator ink was screen printed onto selected areas of the pre-gelled expandable mix, and the deposit was pre-gelled for 60 seconds at 125° C.

| Weat layer | |
| --- | --- |
| Polyvinyl chloride (Dispersion Grade K80) | 100 |
| Butyl benzyl phthalate | 38.5 |
| Epoxy plasticiser (LANKROFLEX ED3) | 5 |
| Texanol isobutyrate | 8 |

| -continued | |
|---|---|
| Weat layer | |
| Thio-tin stabiliser (INTERSTAD T135) | 1 |

A 0.008 inch coating of the wear layer was applied to the pre-gelled printed material, and the product expanded by heating for 90 seconds at 200° C. The product had an excellent embossed surface.

| Gauge printed areas | 0.067 inch |
|---|---|
| Gauge unprinted areas | 0.056 inch |
| Contrast of finished product | 0.011 inch |

EXAMPLE 4

The procedure of Example 3 was repeated but the pre-gelled printed material was stored for 24 hours before expansion. The finished product had excellent embossed characteristics, and was very suitable for use as a floor covering.

EXAMPLE 5

The procedure of Example 3 was repeated but the zinc octoate activator in the activator ink was replaced with cadmium octoate.

| Gauge printed areas | 0.066 inch |
|---|---|
| Gauge unprinted areas | 0.056 inch |
| Contrast | 0.010 inch |

EXAMPLE 6

The procedure of Example 4 was repeated but the zinc octoate in the activator ink was replaced with cadmium octoate. The finished product, which had excellent characteristics for use as a floor covering, had a greater depth of embossing than that obtained in Example 5.

| Gauge printed areas | 0.069 inch |
|---|---|
| Gauge unprinted areas | 0.056 inch |
| Contrast | 0.013 inch |

EXAMPLE 7

The procedure of Example 3 was repeated but 1 part azodicarbonamide (GENITRON AC2) per hundred parts PVC was added to the activator ink. The product was similar to that of Example 3 but the depth of embossing was improved:

| Gauge printed areas | 0.072 inch |
|---|---|
| Gauge unprinted areas | 0.056 inch |
| Contrast | 0.016 inch |

EXAMPLE 8

The procedure of Example 7 was repeated but the pre-gelled printed material was stored for 24 hours before expansion:

| Gauge printed areas | 0.075 inch |
|---|---|
| Gauge unprinted areas | 0.056 inch |
| Contrast | 0.019 inch |

EXAMPLE 9

The expandable mix of Example 3 was coated to a thickness of 0.010 inch on a resin bonded asbestos substrate, suitable for floor covering materials, and pre-gelled for 60 seconds at 125° C.

The pre-gelled material was screen printed with the activator ink of Example 3 to a thickness of 0.006 inch. The printed material was expanded for 80 seconds at 200° C.

| Gauge printed areas | 0.063 inch |
|---|---|
| Gauge unprinted areas | 0.048 inch |
| Contrast | 0.015 inch |

The finished product has an excellent embossed appearance with full colour tones in both the printed and unprinted areas. Because of the excellent physical characteristics of the printed layer, the product was suitable for use as a floor covering without the need for a wear layer.

I claim:

1. A process for embossing a thermoplastic polymeric material by selective expansion which comprises
   forming into sheet form an expandable mix containing a thermoplastic polymeric material and a chemical blowing agent,
   applying to selected areas of the surface of said sheet an activator ink composition in the form of a plastisol or organosol containing a vinyl resin, 10–200 parts by weight of a plasticizer for said vinyl resin per 100 parts of said vinyl resin, a chemical blowing agent, and a kicker for said chemical blowing agent in said expandable mix and in said activator ink composition, and
   heating said sheet to a temperature and for a time such that in those areas of said sheet in contact with said kicker-containing activator ink composition, said chemical blowing agent in said sheet is decomposed to a greater degree than in the remaining areas and said sheet is thereby differentially selectively expanded.

2. A process according to claim 1 wherein the concentration of said chemical blowing agent in said kicker-containing activator ink composition is 0.2–5 parts by weight per 100 parts by weight of said vinyl resin.

3. A process according to claim 1 wherein the vinyl resin is a polymer of vinyl chloride.

4. A process according to claim 1 wherein the plasticiser in the activator ink is selected from esters of phthalic acid, esters of sebacic acid, esters of adipic acid, phosphoric acid esters, and combinations thereof.

5. A process according to claim 1 wherein the activator ink is an organosol comprising a volatile vinyl resin solvent which is a ketone.

6. A process according to claim 1 wherein the kicker is selected from compounds of zinc, compounds of cadmium, compounds of lead, and mixtures thereof.

7. A process according to claim 1, wherein said selected areas on the surface of said sheet to which said kicker-containing activator ink composition is selectively applied becomes relatively higher than the remaining areas to which said kicker-containing activator ink composition is not applied and become cumulatively relatively even higher than said remaining areas subsequent to said heating and blowing operation.

8. A process according to claim 1 wherein the activator ink contains 0.5 to 25% by weight of the kicker.

9. A process according to claim 1 wherein the activator ink is printed to a depth of 0.001–0.015 inch.

10. A process according to claim 1 wherein the thermoplastic polymeric material is selected from polyamides, polyesters, poly polyolefins, polyacrylates, polystyrenes and polymerisation products of halogen substituted olefins.

11. A process according to claim 1 wherein the blowing agent in the expandable mix comprises azodicarbonamide.

12. A process according to claim 1 wherein the activator ink is applied to the expandable mix by a screen printing technique.

13. A process according to claim 1 wherein the expandable mix contains a stabiliser for the expandable mix.

14. A process according to claim 11 wherein the stabiliser is selected from tin compounds, barium compounds and combinations of barium compounds with zinc or cadmium compounds.

15. A process according to claim 11, wherein said stabilizer which is included in said expandable mix possesses little or no kicking action on said blowing agent in said expandable mix.

* * * * *